(12) United States Patent
Carter et al.

(10) Patent No.: US 7,464,724 B2
(45) Date of Patent: Dec. 16, 2008

(54) VALVE ASSEMBLY

(75) Inventors: Jeffrey W. Carter, Provo, UT (US); Kelly H. McCloy, Murray, UT (US); Steven Tyler, Garden Grove, CA (US)

(73) Assignee: Pearl Enterprises, LLC, Centerville, UT (US)

( * ) Notice: Subject to any disclaimer, the term of this patent is extended or adjusted under 35 U.S.C. 154(b) by 183 days.

(21) Appl. No.: 11/198,339

(22) Filed: Aug. 5, 2005

(65) Prior Publication Data

US 2006/0076064 A1   Apr. 13, 2006

Related U.S. Application Data

(60) Provisional application No. 60/617,482, filed on Oct. 8, 2004.

(51) Int. Cl.
*F16K 15/04* (2006.01)
*F16K 11/10* (2006.01)

(52) U.S. Cl. .............. 137/601.19; 137/516.25; 137/601.2; 137/624.14

(58) Field of Classification Search ........... 137/601.19, 137/624.11–624.15, 601.2, 513.7, 516.25; 15/320, 205 R, 404; 68/205 R; 239/99
See application file for complete search history.

(56) References Cited

U.S. PATENT DOCUMENTS

| 2,183,150 | A | * | 12/1939 | Patterson | 251/244 |
| 2,558,687 | A | * | 6/1951 | Krueger | 137/601.19 |
| 2,841,174 | A | * | 7/1958 | Frye | 137/514.5 |
| 3,605,808 | A | * | 9/1971 | Krueger | 137/599.18 |
| 5,474,104 | A | * | 12/1995 | Borland et al. | 137/601.2 |
| 5,634,229 | A | * | 6/1997 | Stoltz | 137/521 |
| 5,725,013 | A | * | 3/1998 | Premiski et al. | 137/454.2 |
| 6,098,228 | A | * | 8/2000 | Chang | 137/624.14 |
| 6,186,423 | B1 | * | 2/2001 | Chapman | 239/729 |
| 6,491,056 | B2 | * | 12/2002 | Gibb | 137/271 |
| 2003/0029929 | A1 | * | 2/2003 | Rosenberg | 239/99 |

* cited by examiner

*Primary Examiner*—Stephen M Hepperle
(74) *Attorney, Agent, or Firm*—Bryan G. Pratt; Rader, Fishman & Grauer PLLC

(57) ABSTRACT

A valve assembly, includes a first lumen; a second lumen providing fluid communication between a plurality of points in said first lumen; and a ball and spring assembly sealingly disposed in said first lumen between said plurality of points, wherein said spring exerts a force on said ball to seal said first lumen; wherein said valve assembly is configured to oscillate a pressure of a fluid passing through said valve assembly.

6 Claims, 7 Drawing Sheets

VALVE ASSEMBLY

RELATED APPLICATIONS

The present application claims the benefit of Provisional Application Ser. No. 60/617,482, filed Oct. 8, 2004, which application is incorporated herein by reference in its entirety.

TECHNICAL FIELD

The present disclosure relates to cleaning apparatuses. More specifically, the present system and method relates to cleaning apparatuses configured to apply a jet or a stream of fluid to a surface to be cleaned.

BACKGROUND

Carpets, draperies, blinds, upholstery, solid surfaces, and the like are often cleaned using steam/hot water systems. Since these units typically operate on similar principles, but at different pressures and with different solvents, they are all generically and interchangeably referred to herein as carpet cleaners, carpet cleaning machines, systems, equipment, units, and so on. In general, steam/hot water systems include the same basic components, namely a wand for dispensing and recovering a cleaning fluid, an optional reservoir for holding reserve fluid, a fluid pump for providing pressurized cleaning fluid at the wand, an air pump (sometimes referred to as a vacuum pump) for sucking up spent fluid, and a spent fluid holding tank. Carpet cleaning equipment contemplated herein ranges from relatively small residential units to large, truck mounted units with long hoses reaching from the truck to the surface to be cleaned.

The efficacy of steam/hot water type carpet cleaning equipment is dependent upon many factors including operator skill and experience, the quality and condition of the machine, the solvents used, the temperature at which the cleaning fluid is dispensed, etc. However, there are four factors that affect both the efficacy of the carpet cleaning apparatus and the amount of dry time required to dry a recently cleaned carpet: fluid pressure, suction or liquid evacuation capabilities, temperature of the water or other solution used, and the amount of agitation provided. The pressure and the temperature of the solution used in traditional cleaning systems are somewhat limited due to established safety standards. More specifically, if the pressure and heat of the solution passing through the carpet cleaner exceed the containment capabilities of the carpet cleaning unit, undesirable accidents may occur.

Consequently, many carpet cleaning systems focus on enhancing the suction and agitation capabilities of the carpet cleaning systems in order to reduce the necessary dry time for the cleaned articles. Specifically, by enhancing the agitation capabilities of a carpet cleaning system, fewer passes entailing distribution of the cleaning solution may be used to provide adequate cleaning. Less cleaning solution equates to reduced drying time for the article being cleaned and increased income to an employer of the carpet cleaning system. Further, enhancing the vacuum capabilities of the carpet cleaning system will remove more cleaning solutions per pass, resulting in reduced dry times.

Traditional carpet cleaning systems prefer rotating brushes for agitating the carpet and spray nozzles for spraying cleaning solution onto the carpet. According to traditional embodiments, the solution dispensing components are located relatively remote from the vacuum recovery device, causing cleaning solution to penetrate deeply into the carpet prior to recovery and therefore degrading solution recovery effectiveness. Additionally, the use of brushes causes penetration of the carpet with flexible bristles and consequently pulls out carpet fibers and generally degrades the carpet and causes excessive wear. Further, the use of brushes to enhance agitation is relatively expensive and complex, causing brush agitating carpet cleaning systems to suffer from poor reliability. For example, rotating brushes are connected with belts and pulleys which are relatively expensive and a common source of maintenance problems.

SUMMARY

A valve assembly, includes a first lumen; a second lumen providing fluid communication between a plurality of points in said first lumen; and a ball and spring assembly sealingly disposed in said first lumen between said plurality of points, wherein said spring exerts a force on said ball to seal said first lumen; wherein said valve assembly is configured to oscillate a pressure of a fluid passing through said valve assembly.

BRIEF DESCRIPTION OF THE DRAWINGS

The accompanying drawings illustrate various embodiments of the present system and method and are a part of the specification. The illustrated embodiments are merely examples of the present system and method and do not limit the scope of the disclosure.

Throughout the drawings, identical reference numbers designate similar, but not necessarily identical, elements.

DETAILED DESCRIPTION

A cleaning apparatus is disclosed herein that allows for the pulsed application of a cleaning solution. The apparatus further allows the cleaning solution to be applied to a desired surface at relatively high temperatures and pressures. In one exemplary embodiment, movement of a ball or sealing sphere between first and second positions causes a pulse in the flow of liquid. This pulsation may reach and/or exceed 30 pulses per second depending on the adjustment of the valve. Additionally, according to one exemplary embodiment, the pulsation may be accomplished due to a translation of the ball of approximately one eighth of an inch or less. Further, as discussed in detail below, a valve assembly such as a needle valve assembly, allows for the adjustment of pressures, thereby controllably facilitating pulsation at the above-mentioned frequencies with multiple input pressures.

In the following description, for purposes of explanation, numerous specific details are set forth in order to provide a thorough understanding of the present system and method. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Figure 1:
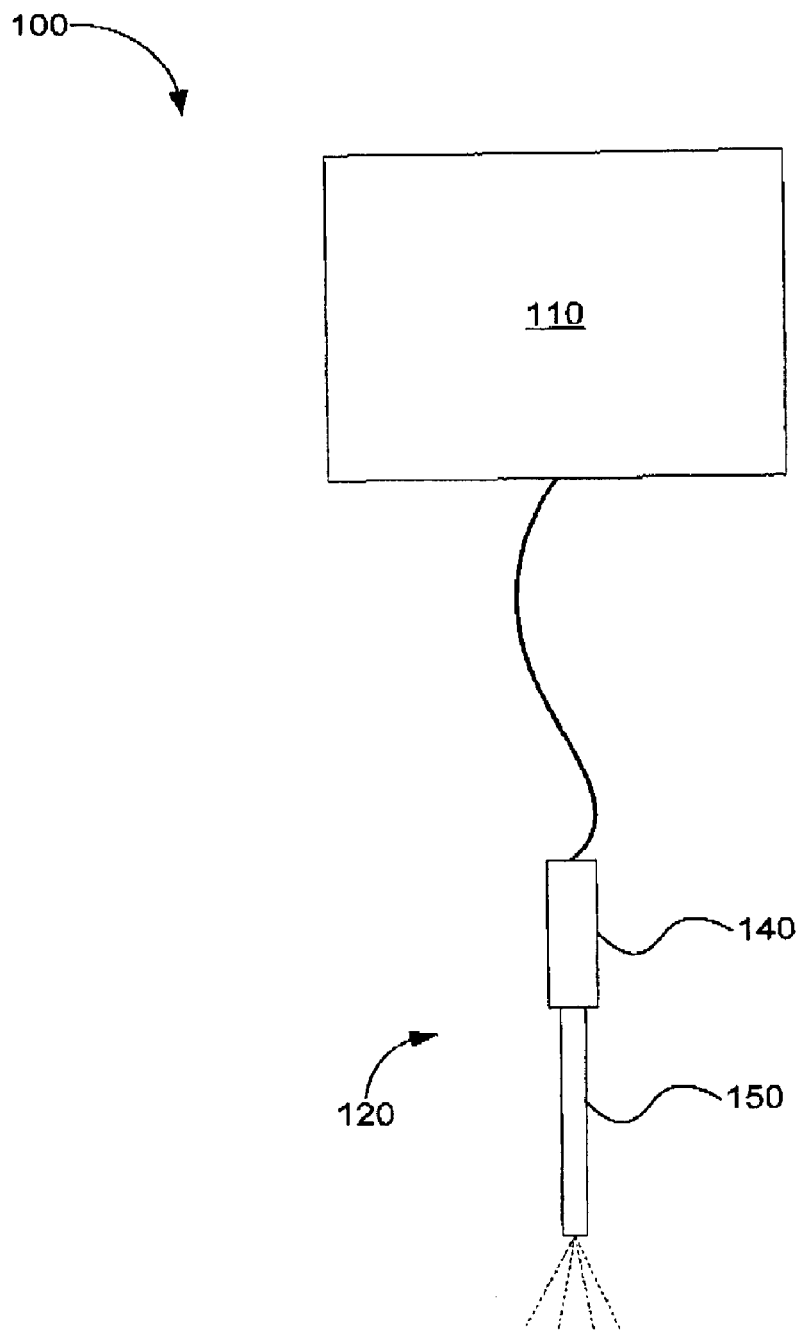
FIG. 1 is a schematic diagram of a cleaning system according to one exemplary embodiment.

An exemplary cleaning system (100) is illustrated in FIG. 1. As shown, the exemplary surface cleaning system (100) generally includes a pressurized water or solution source (110) and a sprayer assembly (120). The pressurized water source (110) pressurizes and/or heats water or a solution to a desired temperature and/or pressure levels. Further, the cleaning system (100) may also include a cleaning solution tank (not shown) coupled to the pressurized water source (110) and/or the sprayer assembly (120) to provide a cleaning solution for cleaning surfaces, such as carpet, tile, etc. According to the exemplary embodiment illustrated in FIG. 1, the pressurized water source (110) is fluidly coupled to the sprayer assembly (120) via one or more hoses (160). According to the exemplary embodiment illustrated in FIG. 1, the one or more hoses (160) are configured to provide pressurized and/or heated water and/or cleaning solution on demand to the sprayer assembly (120).

Continuing with FIG. 1, the sprayer assembly (120) is configured to provide a pulsed spray of water and/or cleaning solution to a surface, such as carpet, tile, and the like. According to one exemplary embodiment, the sprayer assembly (120) generally includes a pulse valve assembly (140) and a wand (150). During operation of the present exemplary embodiment, liquid from the pressurized water source (110) passes through the one or more hoses (160) to provide water and/or cleaning solution through the pulse valve assembly (140) and out of the wand (150). According to the present exemplary embodiment, the pulse valve assembly (140) allows the applied water and/or cleaning solution to be rapidly pulsed during its application to the surface to be cleaned, thereby increasing the agitation experienced by the surface to be cleaned. The increased agitation results in a faster dry time and increased cleaning power.

Figure 2:
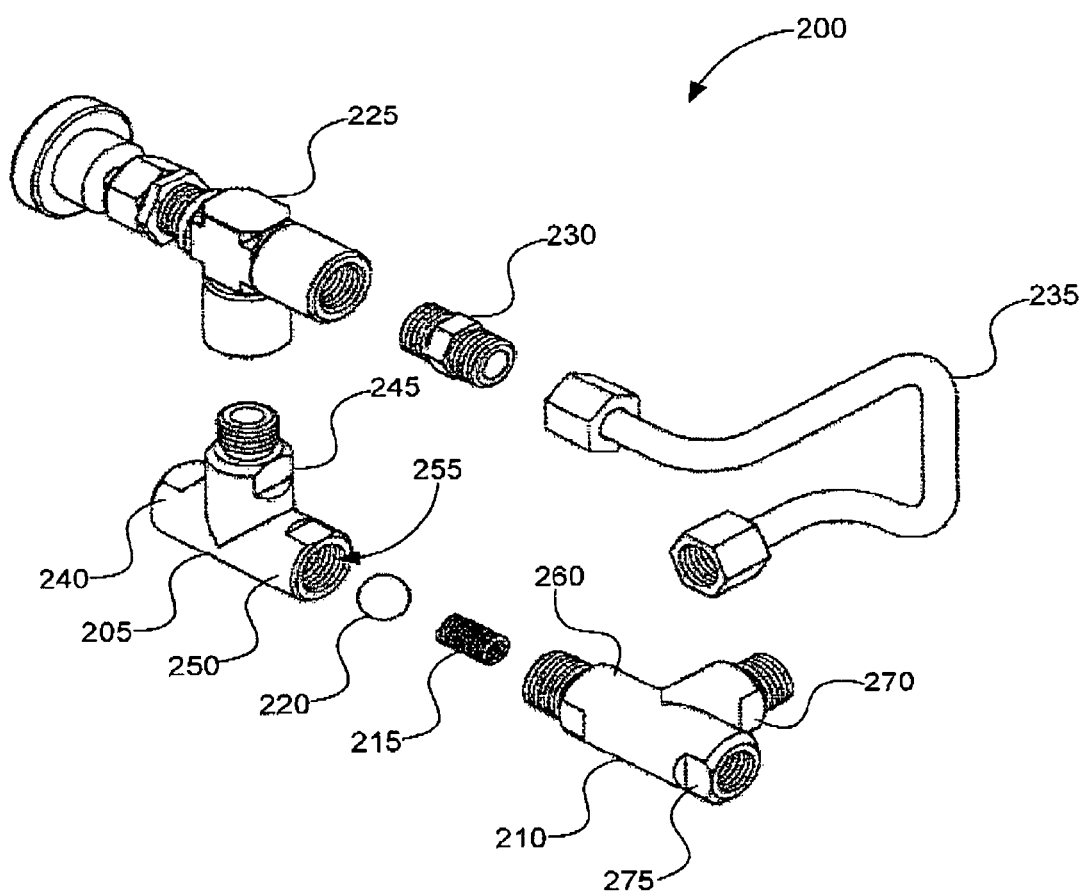
FIG. 2 is an exploded perspective view of a pulse valve assembly according to one exemplary embodiment.

FIG. 2 illustrates an exploded perspective view of a pulse valve assembly (200) according to one exemplary embodiment. According to the present exemplary embodiment, the pulse valve assembly (200) receives liquid, such as water and/or cleaning solution from any suitable source, converts the steady flow of pressurized liquid into a pulsed flow, and directs the liquid to a wand or other terminal applicator, such as a rotating tile cleaner or other terminal applicators as are well known in the art.

According to the exemplary embodiment illustrated in FIG. 2, the pulse valve assembly (200) generally includes a ball housing (205), a spring valve housing (210), a spring (215), a ball (220), a needle valve assembly (225), a coupler (230), and a director tube (235). When properly coupled, the ball valve (205) is coupled to the pressurized liquid source (110; FIG. 1), such as by way of a flexible hose. After the pressurized liquid has passed through the pulse valve assembly (200), it is directed toward the surface to be cleaned, such as by way of a wand, a rotating tile cleaner, or other suitable fluid direction devices. The exemplary configuration and operation of the pulse valve assembly (200) will be discussed in more detail below.

According to the present exemplary embodiment, the ball housing (205) includes a primary inlet (240), a bypass outlet portion (245) and a through outlet portion (250). A pathway is defined in the ball housing (205) such that liquid that enters the primary inlet (240) is direct to either the bypass portion (245) and/or the through outlet portion (250). The characteristics of how liquid passes from the primary inlet (240) to the bypass outlet portion (245) are controlled, at least in part, by the positioning and characteristics of the needle valve assembly (225). In particular, according to one exemplary embodiment, the needle valve assembly (225) is configured to selectively control a flow of liquid from the bypass outlet portion (245) that is directed through the coupler (230) and director tube (235) to the spring valve housing (210).

For example, according to one exemplary embodiment, fluid that enters the primary inlet (240) does so at a particular initial pressure. In the absence of the needle valve assembly (225) or other intervening components in the ball housing (205), the liquid would then tend to enter each arm of the ball housing according to the effective area of the pathways at or near the split between the fluid flowing from the primary inlet (240) to the bypass outlet portion (245) and the through outlet portion (250).

However, according to the present exemplary embodiment, the effective area of the bypass outlet portion (245) is controlled with the selective positioning of the needle valve assembly (225). In particular, by moving the needle valve assembly (225) toward a closed position, the liquid exiting the bypass outlet portion (245) of the ball housing (205) has less area through which to pass. Consequently, in such a case a larger volume of liquid would tend to flow toward the through outlet portion (250) of the ball housing (205). The tendency of fluid to flow in large or small volume rates affects the pressures present in each particular portion of the cleaning system (100; FIG. 1). Accordingly, the tendency to cause more water to flow through the through outlet portion (250) increases the relative pressure in that portion.

Conversely, moving the needle valve assembly (225) toward an open position tends to cause an increase of liquid to pass from the bypass outlet portion (245) through the needle valve assembly (225). Liquid that passes through the needle valve assembly (225) passes through the coupler (230) and the director tube (235) to the spring housing assembly (220). Accordingly, a first liquid pathway, or a bypass liquid pathway, is defined from the primary inlet (240), through the bypass outlet portion (245) of the ball housing (205), through the needle valve assembly (225), and through a coupler (230) and a director tube (235) to the spring housing (210).

A second liquid pathway, or a through liquid pathway, is defined from the primary inlet (240), through the through outlet portion (250) of the ball housing (205), and to the spring housing (210). As liquid passes through the through outlet portion (250), the liquid passes through a seating portion defined therein and a through a ball containment chamber (255). According to the present exemplary embodiment, the seating portion (250) provides a sealing face for a ball contained within the ball containment chamber (255), as will be discussed in more detail below with reference to FIGS. 3-6. As illustrated, the spring housing (220) generally includes a through inlet portion (260), a bypass inlet portion (270), and a primary outlet portion (275). According to one exemplary embodiment, the spring housing (220) includes a pathway defined by these portions. Liquid entering from the inlet portions (260) is directed to the primary outlet portion (275). The particular interaction of the ball housing (205) and the spring housing (210) will be discussed in more detail below with reference to FIGS. 3-6.

Figure 3:
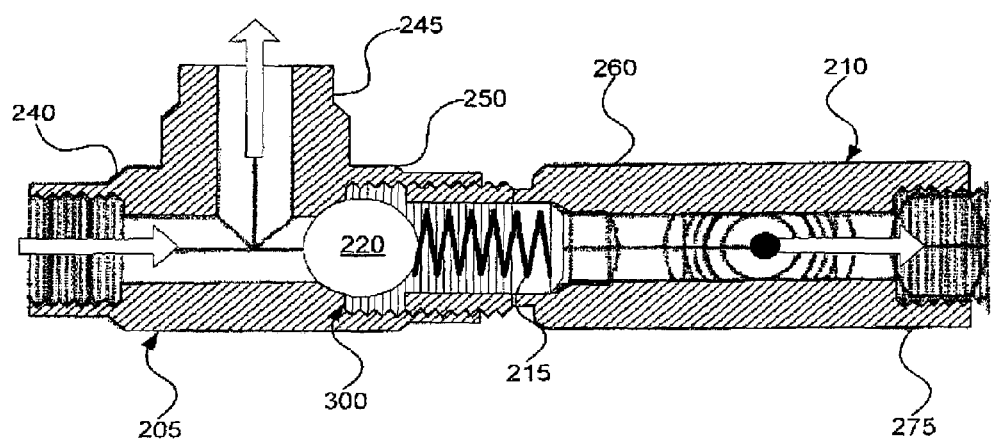
FIG. 3 is a partial cross-sectional view of a pulse valve assembly wherein a ball is in a first closed position, according to one exemplary embodiment

FIG. 3 illustrates a partial cross sectional view of the pulse valve assembly (200) showing the ball (220) in an initial closed position, according to one exemplary embodiment. In particular, FIG. 3 illustrates the pathways defined in the ball housing (205) and the spring housing (210) during an initial closed position. As illustrated in FIG. 3, the arrows indicate the direction of liquid flow through the pulse valve assembly.

As shown in FIG. 3, the spring (215) is shown providing a biasing force against the ball (220) to thereby urge the ball into sealing contact with a sealing face (300) defined in the through outlet portion (250). This sealing contact between the ball (220) and the sealing face (300) causes a substantial portion of the fluid flow entering the primary inlet (240) to flow through the bypass outlet portion (245) of the ball housing (205). The liquid is then directed through the bypass liquid pathway described above until the liquid is directed to the bypass inlet portion of the spring housing (210).

Once present in the inlet portion of the spring housing (210), the liquid then exits the pulse valve assembly (200) through the primary outlet portion (275), which leads to a wand (150; FIG. 1) or other suitable fluid direction device. Accordingly, in an initial closed position a substantial portion of the liquid entering the pulse valve assembly (200) passes through the bypass liquid pathway and out the wand (150; FIG. 1). As illustrated in FIG. 3, liquid entering the spring housing (210) via the bypass liquid pathway is indicated by an arrow with a solid black circular tail.

Figure 4:
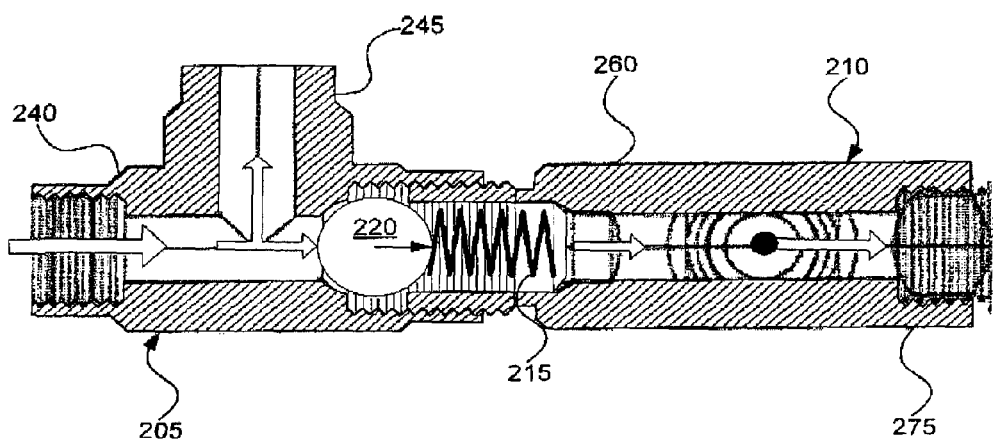
FIG. 4 is a partial cross-sectional view of a pulse valve assembly in which the ball is in an intermediate position, according to one exemplary embodiment.

As the liquid enters the pulse valve assembly (200), the liquid tends to exert a pressure on the frontal surface of the ball (220). As shown in FIG. 4, this pressure causes a resulting force that acts upon the ball (220) and, consequently, the spring (215). As the above-mentioned force acts upon the ball (220), the biasing force exerted by the sprint (215) is overcome. According to the present exemplary embodiment, the amount of force exerted upon the ball (220) by the fluid entering the pulse valve assembly (200) is at least partially controlled by the position of the needle valve (225; FIG. 2). More specifically, by varying the position of the needle valve (225; FIG. 2), the orifice that leads to the bypass liquid pathway may be adjusted to increase the pressure exerted against the ball (220), thereby varying the liquid force exerted on the ball (220). The force exerted by the liquid entering the pulse valve assembly also depends, at least in part, on the pressure differential on either side of the ball (220). That is, when the ball (220) is in a first closed position, the pressure differential will be at a first large value due to the relatively low pressure on the spring housing side of the ball (220). When the liquid force exerted on the face of the ball (220) is sufficiently high, it will overcome the biasing force exerted by the spring (215), and may begin to translate the ball.

Figure 5:
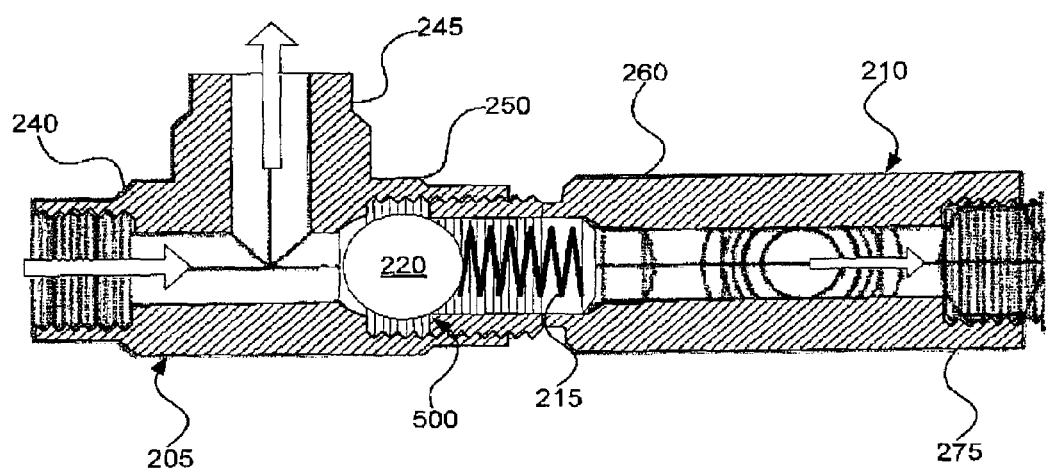
FIG. 5 is a partial cross-sectional view of a pulse valve assembly in which the ball is in a second closed position, according to one exemplary embodiment.

As the ball (220) moves away from its initial sealing contact with the sealing face (330), liquid will flow to the spring housing (210) via both the bypass liquid pathway and the through liquid pathway as illustrated in FIG. 4. with continued force provided by the fluid, the ball (220) may be translated sufficient to permit a relatively large flow of fluid to pass, as illustrated in FIG. 5.

FIG. 5 illustrates the ball (220) in a second sealing position. In this second sealing position, the ball (220) is placed in sealing contact with a sealing face (500) of the spring housing (210). While the ball (220) is in the second sealing position shown in FIG. 5, a substantial portion of the liquid entering the primary inlet (240) is directed to the spring housing (210) via the bypass liquid pathway previously described.

Figure 6:
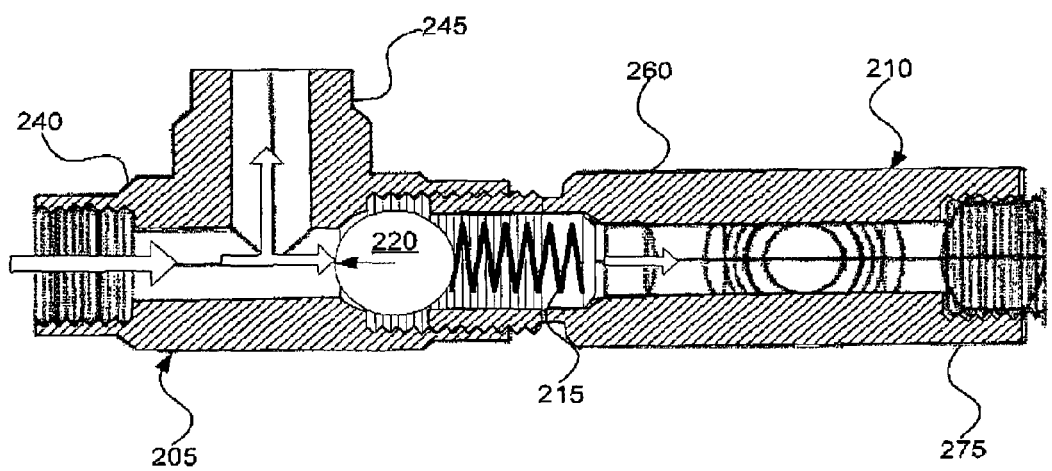
FIG. 6 is a partial cross-sectional view of a pulse valve assembly in which the ball is in an intermediate position, according to one exemplary embodiment.

As the liquid enters the spring housing (210) while the ball (220) is in the second sealing position, the pressure on either side of the ball (220) will begin to equalize. In particular, liquid entering the pulse valve assembly (200) will be pressing against the ball from the side of the ball housing (205) while the pressure in the spring housing (210) will be approximately the same, due, at least in part, to the flow of a substantial portion liquid via the bypass liquid pathway. As the difference between the two pressures becomes smaller, the biasing force exerted by the spring will tend to urge the ball (220) toward the sealing face (300) in the ball housing (205), as illustrated in FIG. 6. As the biasing force exerted by the spring (215) continues on the ball (220), the ball will continue to be urged back to the first sealed position illustrated in FIG. 3. With the ball (220) seated in the first sealed position, pressures on the face of the ball again begin to build and the cycle illustrated in FIGS. 3 through 6 repeats.

According to one exemplary embodiment, the movement of the ball (220) between the first and second sealed positions and the resulting variation in the flow path of the liquid causes a pulse in the flow of the liquid. This pulsation may reach and/or exceed, according to one exemplary embodiment, approximately 30 pulses per second, depending on the adjustment of the valve. Additionally, according to one exemplary embodiment, the generated pulsation may be accomplished by translating the ball (220) approximately one-eighth of an inch or less. Alternatively, greater linear motion of the ball (220) may be allowed to create a different pulse in the flow of the liquid. Further, as previously discussed, the needle valve assembly (225; FIG. 2), or other valve assembly, allows for the adjustment of pressures, thereby facilitating pulsation at the above frequencies with multiple input pressures.

According to one exemplary embodiment, the components used to form the spring (215) and the needle valve assembly (225; FIG. 2) may be "Swedgelock" components. More particularly, the needle valve assembly (225; FIG. 2) discussed above is a single example of a suitable valve. While a needle valve is described above, any suitable device may be used to control the flow of liquid along a bypass liquid pathway and/or a through liquid pathway. Further, the components illustrated above and in the accompanying figures may be made of any number of suitable materials including, but in no way limited to, brass, copper, plastic, nylon, etc. Additionally, the components illustrated above may be formed out of stainless steel to provide enhanced corrosion resistance.

Moreover, components illustrated herein as separate components may be formed as a single unitary piece to reduce part count. Also, components illustrated herein as a single component may be formed out of multiple threaded or otherwise coupled components.

Alternative Exemplary Embodiment

Figure 7:
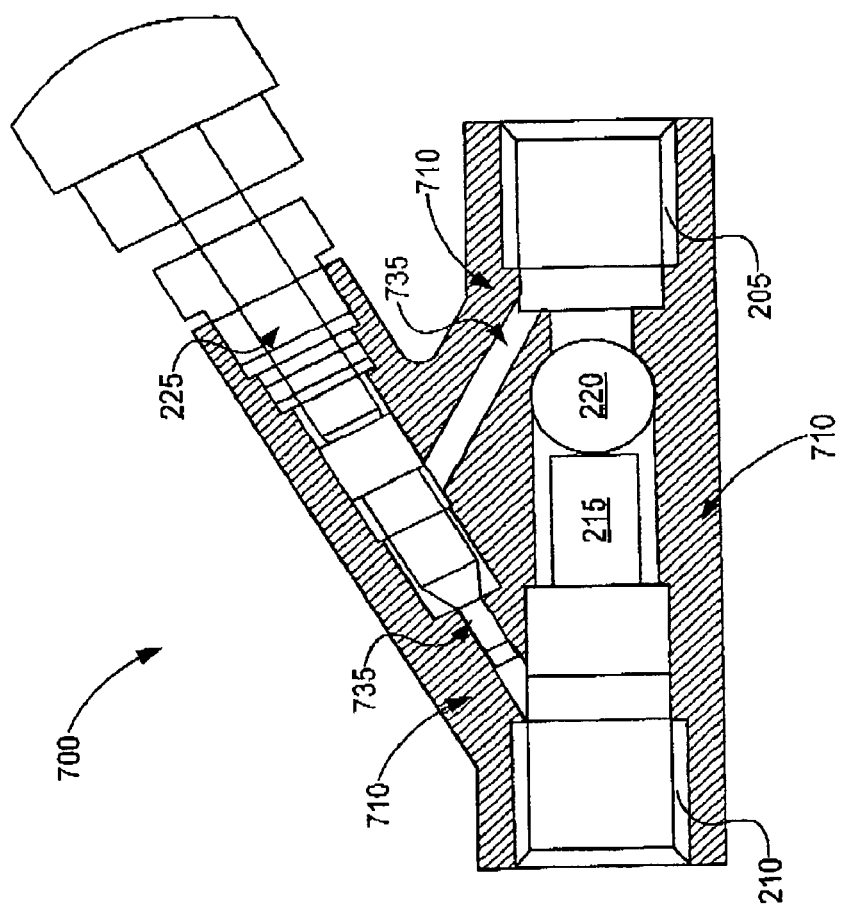
FIG. 7 is a cross-sectional top view of a pulse valve assembly in which the director tube is embedded within a housing of a pulse valve assembly, according to one exemplary embodiment.

In addition to the above-mentioned configuration, the pulse valve assembly may be formed as a single unitary piece to reduce part count. Alternatively, the components illustrated in FIG. 2 may be formed out of multiple threaded or otherwise coupled components. According to one exemplary embodiment shown in the exemplary cross-sectional top view of FIG. 7, an alternative exemplary pulse valve assembly (700) may include the director tube (735) embedded within the housing (710) of the pulse valve assembly (700). More specifically, as illustrated in FIG. 7, the housing (710) of the exemplary pulse valve assembly (700) houses a ball housing (205), a spring housing (210), a spring (215), a ball (220), a needle valve assembly (225), and a director tube (735). According to the exemplary embodiment illustrated in FIG. 7, the housing (710) is engineered and machined to allow for the same pulsating action caused by translation of the ball (220) as described above. However, in contrast to the exemplary embodiment described above, housing the entire pulse valve assembly (700) in a single housing (710) reduces part count of the resulting pulse valve assembly (700) while allowing the pulse valve assembly to resist wear and tear on various elements of the pulse valve assembly (700). Specifically, encapsulating the director tube (735) in the body of the pulse valve assembly reduces damage and wear that may occur if not protected by the housing (710). Additionally, incorporating all of the above-mentioned components into a single housing (710) creates a simpler, less imposing apparatus for the user to operate.

Figure 8:
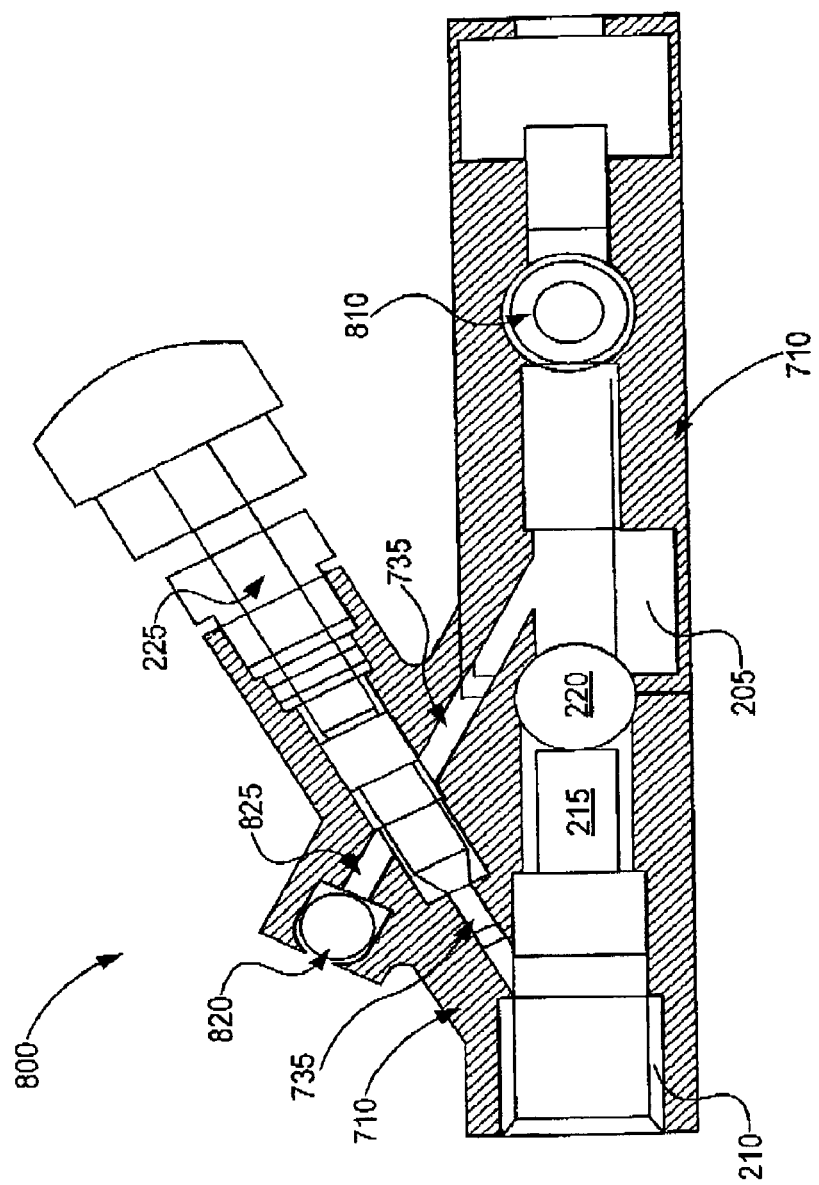
FIG. 8 is a cross-sectional top view of a pulse valve assembly including a trigger valve in which the director tube is embedded within a housing of a pulse valve assembly, according to one exemplary embodiment.

FIG. 8 illustrates a cross sectional top view of an alternative exemplary pulse valve assembly (800) in which the director tube (735) is embedded within the housing (710) of the pulse valve assembly (800). Additionally, as illustrated in FIG. 8, a trigger valve (810) is coupled to an inlet of the pulse valve assembly. According to the exemplary embodiment illustrated in FIG. 8, the trigger valve (810) allows the user to control the inlet of water and/or cleaning solution into the exemplary pulse valve assembly (800). By actuating the trigger (not shown), the trigger valve (810) opens and allows pressurized liquid to enter the housing (710) of the pulse valve assembly (800). Conversely, by releasing the trigger (not shown), the trigger valve (810) closes, preventing any fluid to further flow into the pulse valve assembly (800).

According to the exemplary embodiment illustrated in FIG. 8, when the trigger valve (810) is open to permit fluid to enter the housing (710) of the pulse valve assembly (800), the fluid enters and exerts a force on the face of the ball (220), positioned in a first sealing position. As mentioned above, the pressure exerted on the face of the ball (220) may be varied by the positioning of the needle valve assembly (225). Consequently, the above-mentioned oscillation of the ball (220) between a first and second sealed position may be accomplished in the alternative exemplary pulse valve assembly (800).

Furthermore, according to one exemplary embodiment, the alternative exemplary pulse valve assembly (800) illustrated in FIG. 8 may be manufactured from a single block of material. According to one exemplary embodiment, the director tube (735) is formed by drilling a plurality of intersecting lumens into a body having the through liquid pathway formed therein. According to one exemplary embodiment, the plurality of intersecting lumen each contact the through liquid pathway on a first end and intersect and exit the body on a second end. According to the exemplary embodiment illustrated in FIG. 8, a first of the plurality of intersecting lumen is tapped to form threads configured to aid in the reception of the needle valve (225). A second of the plurality of intersecting lumen is capped by a plug (820) or other fluid limiting member to create an internally located bypass liquid pathway. According to one exemplary embodiment shown in FIG. 8, the plug (820) may be a seated ball valve. Alternatively, the plug may be any type of apparatus or formation that disallows fluid flow out of the pulse valve assembly (800) through the lumen (825). According to alternative embodiments, it may be possible to eliminate the plug (820) and lumen (825) by incorporating other novel manufacturing methods. Furthermore, the lumen (825) formed in the body may be utilized for other purposes as one skilled in the art may deem useful.

Figure 9:
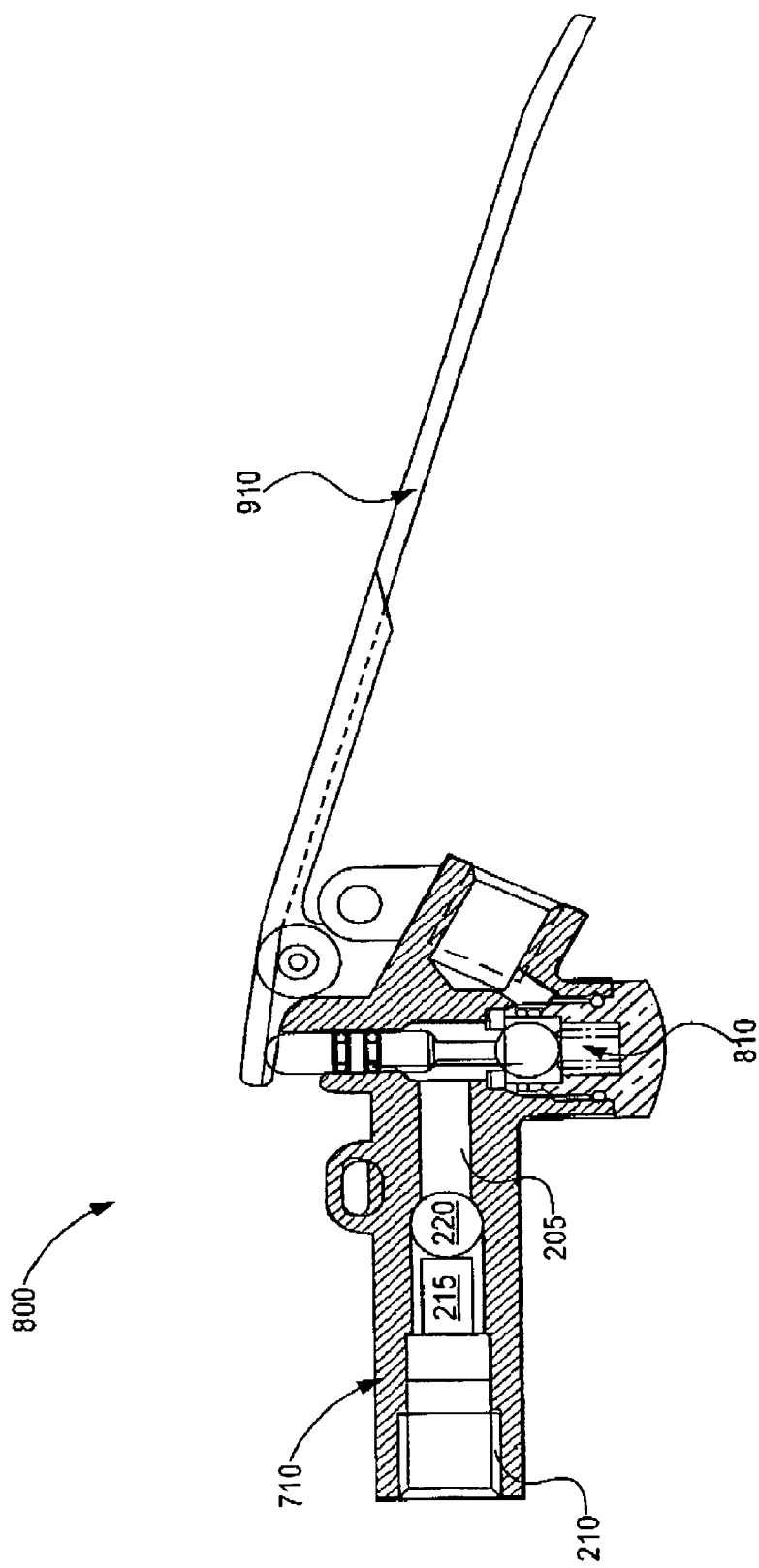
FIG. 9 is a cross-sectional top view of a pulse valve assembly including a trigger valve in which the director tube is embedded within a housing of a pulse valve assembly, according to one exemplary embodiment.

FIG. 9 illustrates a cross-sectional side view of an alternative exemplary pulse valve assembly (800) similar to the exemplary pulse vale assembly in FIG. 8 in which the director tube (735, no shown) is embedded within the housing (710) of the pulse valve assembly (800) further incorporating a trigger valve (810). The trigger (910) is shown here as a lever but may be any type of action that allows the user to selectively open and close the trigger valve (810). During operation, the user actuates the trigger (910), thus opening the trigger valve (810) and allowing fluid to pass to the ball valve (205) and the needle valve assembly (225, not shown) through their own respective lumen. This plurality of lumen allows the ball to vibrate, thereby creating a pulse in the flow of liquid as described above.

The preceding description has been presented only to illustrate and describe exemplary embodiments. It is not intended to be exhaustive or to limit the disclosure to any precise form disclosed. Many modifications and variations are possible in light of the above teaching. It is intended that the scope of the disclosure be defined by the following claims.

What is claimed is:

1. A valve assembly, comprising:
 a first lumen;
 a second lumen providing fluid communication between a plurality of points in said first lumen; and
 a ball and spring assembly sealingly disposed in said first lumen between said plurality of points, wherein said ball has a first sealing position and a second sealing position;
 wherein said spring exerts a force on said ball to selectively seal said first lumen in said first sealing position;
 wherein said valve assembly is configured to oscillate a pressure of a fluid passing through said valve assembly.

2. The valve assembly of claim 1, further comprising a volume regulator disposed in said second lumen; wherein said volume regulator is configured to vary a fluid pressure exerted on said ball.

3. The valve assembly of claim 2, wherein said volume regulator comprises a needle valve configured to regulate a fluid flow through said second lumen.

4. The valve assembly of claim 1, further comprising a trigger valve fluidly coupled to an inlet of said first lumen;
 wherein said trigger valve is configured to selectively control a flow of liquids into said valve assembly.

5. The valve assembly of claim 4, wherein said trigger valve is actuated by a lever.

6. The valve assembly of claim 1, wherein said first lumen and said second lumen are both formed in a single valve body.

* * * * *